UNITED STATES PATENT OFFICE.

JAMES M. NEIL, OF TORONTO, ONTARIO, CANADA, ASSIGNOR TO JOHN B. GREGORY, OF TORONTO, CANADA.

PROCESS FOR THE PRODUCTION OF WHITE-LEAD PIGMENT.

No. 906,454.      Specification of Letters Patent.     Patented Dec. 8, 1908.

Application filed January 30, 1908. Serial No. 413,424.

*To all whom it may concern:*

Be it known that I, JAMES M. NEIL, of the city of Toronto, in the county of York and Province of Ontario, Canada, have invented a Process for the Production of White-Lead Pigment; and I hereby declare that the following is a full, clear, and exact description of the same.

In the process commonly used for the production of resublimed white lead (basic lead sulfate), $2(PbSO_4)(PbO)$ by roasting galena ore (PbS) in the presence of a limited supply of oxygen, and represented by the following chemical equation, $$4PbS + 7O_2 = 2(PbSO_4)(PbO) + 2SO_2,$$

great care and skill are required to prevent metallic lead (Pb) forming instead of the resublimend white lead or basic lead sulfate $$2(PbSO_4)(PbO),$$

which would happen if the amount of oxygen supplied were greater than the proper amount as expressed in the above chemical equation.

The above described process for the production of resublimed white lead, in addition to being very expensive, requires special machinery and special furnaces in its operation.

By means of the invention hereinafter described a substance, to be called white lead pigment, is produced economically, which does not turn black in the presence of sulfur or sulfur compounds, for example, sulfureted hydrogen, $(H_2S)$. The white lead pigment so produced, is of a high white color and has great covering power, and when used in paints and other mixtures, in the place of common Dutch white lead or resublimed white lead, gives good body to such mixture. As the white lead pigment is insoluble in water, it will not be absorbed into the system of the person using the mixture and will consequently produce no injurious results.

The substance with which the process for the manufacture of white lead pigment is commenced, is lead chlorid $(PbCl_2)$ which may be prepared by any desired means or manner, for example by roasting galena ore (PbS) in the presence of chlorin gas, as represented by the chemical equation $$PbS + 2Cl = PbCl_2 + S.$$

The process is commenced by dissolving a certain amount of lead chlorid $(PbCl_2)$ in boiling water. To this solution of lead chlorid is added the necessary amount of sulfuric acid $(H_2SO_4)$ or other soluble sulfate, to precipitate all the lead in the solution as lead sulfate $(PbSO_4)$ as represented by the following chemical equation, $$PbCl_2 + H_2SO_4 = PbSO_4 + 2HCl,$$

when sulfuric acid is used; and when a soluble sulfate is used, for example, sodium sulfate $(Na_2SO_4)$ the chemical equation representing the reaction is,—

$$PbCl_2 + Na_2SO_4 = PbSO_4 + 2NaCl.$$

The insoluble lead sulfate $(PbSO_4)$ so obtained as represented by either of the foregoing chemical equations, is separated from the liquid by filtration or other means, and is then washed in water to remove all traces of any saline matter (NaCl). With this lead sulfate $(PbSO_4)$ there is mechanically mixed, sufficient lead chlorid $(PbCl_2)$ so that the final mixture will have the composition as represented by $2(PbSO_4)(PbCl_2)$. This mixture $2(PbSO_4)(PbCl_2)$ is now boiled with a solution of caustic soda (NaOH) or similar alkaline hydrate until all the lead chlorid $(PbCl_2)$ has been converted into lead hydrate $Pb(OH)_2$ as represented by the following chemical equation, $$2(PbSO_4)(PbCl_2) + 2NaOH = $$
$$2PbSO_4 + Pb(OH)_2 + 2NaCl,$$
$$or = 2(PbSO_4)Pb(OH)_2 + 2NaCl.$$

This white precipitate $$2(PbSO_4)(Pb(OH)_2)$$

is separated from the solution by filtration or other means, and after being washed in water to remove all traces of saline matter (NaCl) is dried, giving the final product which has the composition represented by $$2(PbSO_4)(Pb(OH)_2).$$

This product is a valuable white lead pigment which may be advantageously substituted for Dutch white lead or resublimed white lead in any compounds or mixtures in which they are used.

The resultant chlorid solutions obtained during the carrying out of the above described process are treated if so desired, by electrolysis and converted into chlorin and sodium hydrate which may be used over again in the process to make fresh lead chlorid and hydrate as required.

Having thus fully described my invention what I claim as new and desire to secure Letters Patent is:—

A process for the production of white lead pigment from lead chlorid consisting substantially in treating an aqueous solution of lead chlorid with a sulfate, to precipitate the lead in the lead chlorid as lead sulfate and then separating the precipitate from the solution and washing it to remove all traces of saline matter and then mechanically mixing with the precipitate so obtained, sufficient lead chlorid for the resultant mixture to have the composition represented by the chemical formula $$2(PbSO_4)(PbCl_2),$$

then treating it with a boiling aqueous solution of an alkaline hydrate until the lead chlorid has been converted into lead hydrate and then separating the white precipitate so obtained from the solution and washing it to remove any traces of saline matter, and then drying it, resulting in a white lead pigment of the composition represented by the chemical formula $$2(PbSO_4)(Pb(OH)_2).$$

JAMES M. NEIL.

Signed in the presence of—
C. H. RICHES,
JOHN B. GREGORY.